United States Patent

Kinjo et al.

[15] 3,649,753

[45] Mar. 14, 1972

[54] SIGNAL ADDRESS SYSTEM FOR APPARATUS FOR MAGNETICALLY RECORDING AND REPRODUCING A SIGNAL ON A ROTARY MEMBER

[72] Inventors: Hisao Kinjo, Yokohama; Seiichi Takashima, Kamakura; Takatoshi Kato, Tokyo, all of Japan

[73] Assignee: Victor Company of Japan, Limited, Yokohama, Japan

[22] Filed: Nov. 10, 1969

[21] Appl. No.: 875,295

[30] Foreign Application Priority Data

Nov. 9, 1968 Japan....................................43/81668
Nov. 14, 1968 Japan....................................43/82875

[52] U.S. Cl.....................................178/6.6 DD, 179/100.2 B
[51] Int. Cl.....................G11b 5/82, G11b 27/16, H04n 5/78
[58] Field of Search...........178/6.6 A, 6.6 D, 6.6 FS, 6.6 DD; 179/100.2 B

[56] References Cited

UNITED STATES PATENTS 3,548,095 12/1970 Poulett...............................178/6.6 D

*Primary Examiner*—Stanley M. Urynowicz, Jr.
*Assistant Examiner*—Steven B. Pokotilow
*Attorney*—Louis Bernat

[57] ABSTRACT

A signal address system is adapted for use with apparatus for magnetically recording and reproducing a signal on a rotary member. At least one magnetic head is provided for recording and reproducing a video signal on a rotating magnetic member. The head is moved by drive pulses associated with field signals or frame signals of the video signal. Thus, the number of drive pulses may be used to provide an output signal representing the total number of drive pulses, which is substantially equivalent to an address signal. Thus, an address may be called out without requiring the recording and reproduction of a specific address signal on the magnetic medium.

7 Claims, 11 Drawing Figures

Figure 1:
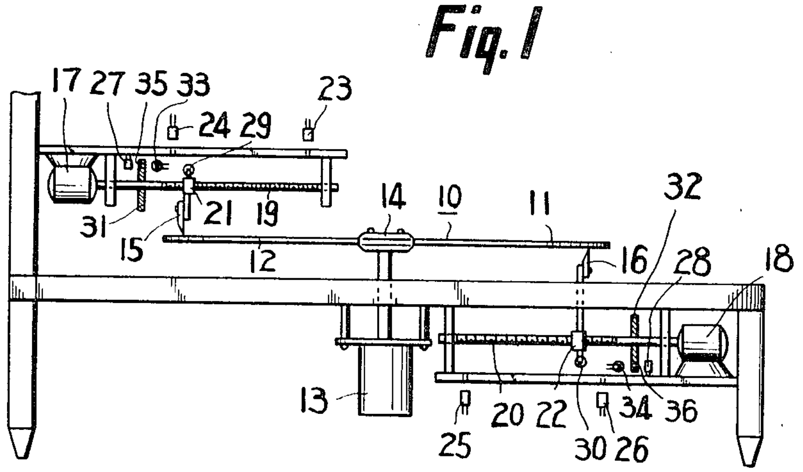
Figure 4A:
Figure 4B:
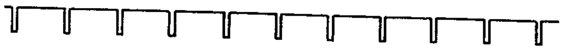
Figure 4C:
Figure 4D:
Figure 4E:
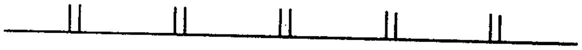

INVENTORS
HISAO KINJO
SEIICHI TAKASHIMA
TAKATOSHI KATO
BY
Louis Bernat
ATTORNEY

INVENTORS
HISAO KINJO
SEIICHI TAKASHIMA
TAKATOSHI KATO
BY Louis Bernat ATTORNEY

SIGNAL ADDRESS SYSTEM FOR APPARATUS FOR MAGNETICALLY RECORDING AND REPRODUCING A SIGNAL ON A ROTARY MEMBER

This invention relates to signal address systems for magnetic recording and reproducing apparatus using a rotating magnetic medium. More particularly, the invention deals with a system for enabling an address calling up of any predetermined signal, as desired, on the rotating magnetic medium.

One address system known in the art is adapted for use with so-called helical-scan video tape recorders. A video signal is there recorded and reproduced by means of at least one magnetic head acting on a magnetic tape rotating in one direction, with recording in tracks laid obliquely with respect to the longitudinal axis of the tape. A specific digital address signal is recorded in a recording operation, and an address for calling up the position of any predetermined signal, as desired, can be effected by indexing the address signal in a playback operation. Such a system has a disadvantage since a magnetic head should be provided for recording and reproducing a specific address signal on the magnetic tape in a specific track.

Also, one system for indicating the position of a recorded signal known in the art is adapted for use with apparatus for magnetically recording and reproducing signals on a rotating magnetic medium. A potentiometer is mounted on a feed shaft for moving the magnetic head. The rotational angle of the shaft is in direct proportion to the resistance distribution, and a substantial recorded position can be indicated by using the potentiometer as if it were a voltmeter. Such system, however, has disadvantages in that (1) if analogue information is indicated by using a rotating pointer, it is difficult to cause the pointer to rotate a number of times in the same direction in an endless continuous recording mode, (2) a time lag is liable to occur in giving an indication because the indication is given through the feed shaft, potentiometer, and the like, and it is particularly difficult to give indication instantly in a stop mode, and (3) it is difficult to indicate very accurately the position of a recorded field or recorded frame.

This invention obviates the aforementioned disadvantages of the prior art. Accordingly, a main object of the invention is to provide a signal address system adapted for use with apparatus for magnetically recording and reproducing signals on a rotating magnetic medium. Here an object is to enable an addressing of any predetermined signal, as desired for playback, without requiring the system to record and reproduce a specific address signal.

Another object of the invention is to provide a signal address system which permits address calling of the position of a signal, as desired in a playback operation, without requiring the use of a magnetic head for recording and reproducing a specific address signal in a specific track on the magnetic medium.

Still another object of the invention is to provide a signal address system which can readily be connected to an automatic editing device. Here an object is to effect substitution of new information for the information already contained in the zone of a predetermined frame of a video signal.

A further object of the invention is to provide a signal address system which accurately indicates the position of any field or frame, as desired, of a recorded video signal, not only in normal motion playback, but also in quick-motion or slow-motion playback.

Still a further object of the invention is to provide a signal address system which positively gives an address indication of a signal recorded in an endless recording mode. This object is accomplished by a rotary indication device which rotates in the same direction when such device is used.

Figure 5A:
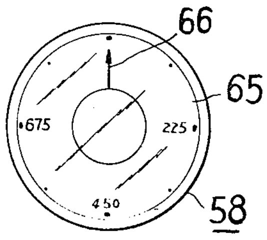
Figure 5B:
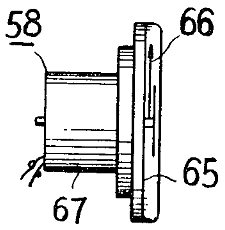
Figures 2A, 2B:
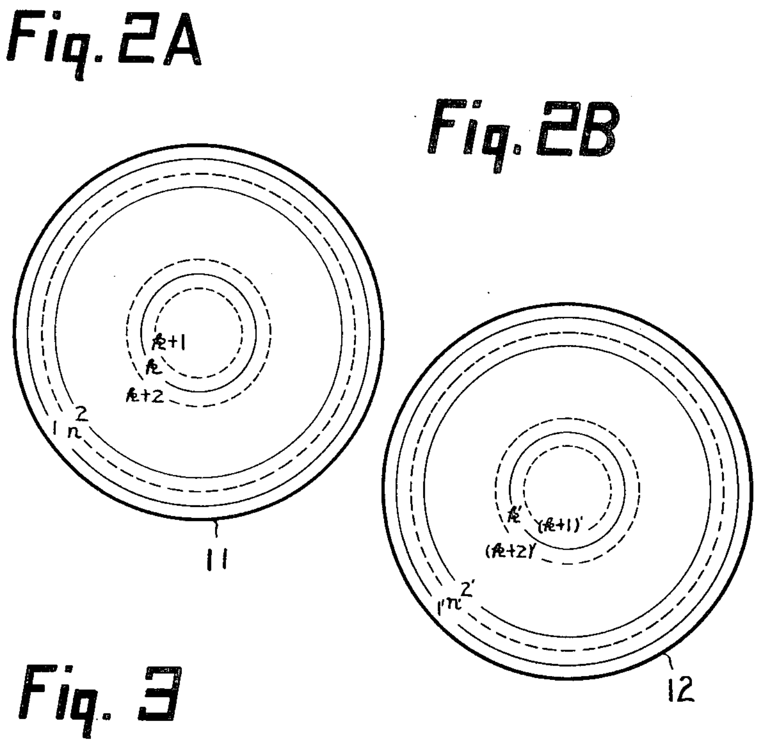
Figure 3:
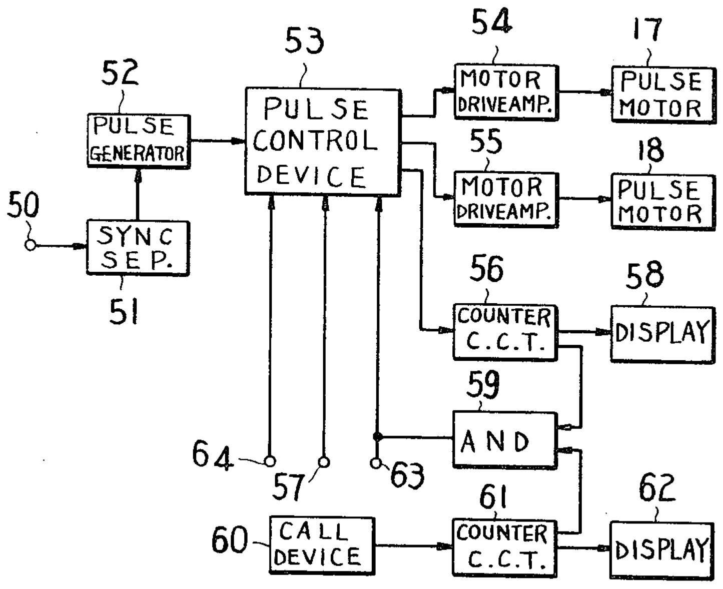

Other objects, as well as features and advantages of the invention, will become evident from a consideration of the description set forth hereinafter when considered in conjunction with the accompanying drawings, in which:

FIG. 1 is a side view of one embodiment of the apparatus for magnetically recording and reproducing signals on a rotating magnetic medium, to which the cue address system according to this invention can be applied;

FIGS. 2(A) and 2(B) show patterns of tracks laid on a rotating magnetic medium;

FIG. 3 is a block diagram of one embodiment of the system according to this invention;

FIGS. 4(A) to 4(E) show the waveforms of signals appearing in the system of FIG. 3; and FIGS. 5(A) and 5(B) are a front view and a side view respectively of one embodiment of the indicator used in the system according to this invention.

In FIG. 1, there is shown a rotating magnetic member 10 which includes first and second magnetic discs 11 and 12, which are superimposed one over the other to form a unitary magnetic member mounted on a hub 14, connected to the rotatable shaft of a disc motor 13. First and second magnetic heads 15 and 16 are used for recording and reproducing a video signal on said magnetic discs 11 and 12, respectively. These heads are secured to first and second head supports 21 and 22, having half-nuts threadably engaging feed screws 19 and 20. These screws are attached to rotatable shafts of first and second pulse motors 17 and 18 respectively. The magnetic heads 15 and 16 are adapted to move linearly and radially over the magnetic discs 11 and 12, as the pulse motors 17 and 18 are rotated intermittently.

Phototransistors 23, 24 and 25, 26 are positioned adjacent the feed screw to detect the positions of the magnetic heads at the ends of their paths of linear movement. Phototransistors 27 and 28 are adapted to detect the positions of the magnetic heads responsive to the rotational movement of the feed screws. The first and second feed screws 19 and 20, associated with the first and second magnetic heads 15 and 16 respectively, are indexed with each other by aligning means with respect to the position for starting the recording of a signal for first and second channels. Lamps 29 and 30, shown in FIGS. 1 and 2, are mounted on the head supports 21 and 22 respectively and move with the respective magnetic heads 15 and 16 as two separate units. Rotary light intercepting plates 31 and 32 are mounted on the rotatable shafts of the pulse motors 17 and 18 respectively. The rotary light intercepting plates 31 and 32 permit the light rays emitted by lamps 33 and 34 to be incident on the phototransistors 27 and 28 when small openings 35 and 36, formed therein are disposed in positions which are on lines connecting the lamps 33 and 34 with the phototransistors 27 and 28 respectively. The operation of this arrangement is described in detail in application Ser. No. 819,846 filed on Apr. 28, 1969, so that detailed description thereof is omitted.

FIG. 3 is a block diagram of one embodiment of the system according to this invention. Synchronizing signals are separated from respective fields of a video signal, shown in FIG. 4(A), by a synchronizing signal separator 51. The synchronizing signals shown in FIG. 4(B), which are separated by the separator 51, are supplied to a clock pulse generator 52 which produces clock pulses shown in FIG. 4(C). On the one hand, the clock pulses are converted and divided, by a pulse control device 53, into two series of motor drive pulses shown in FIGS. 4(D) and 4(E). The pulses of each series occur in each two-field period and are supplied to first and second pulse motor drive amplifiers 54 and 55, for alternately driving the first and second drive motors 17 and 18 respectively. On the other hand, the clock pulses or frame pulses synchronous therewith are also simultaneously supplied to a counter circuit 56. The pulse motors are rotated through 4° by each drive pulse, and make one complete revolution when 90 pulses are applied thereto.

The magnetic discs 11 and 12 are rotated by the disc motor 13 at a rate of 60 revolutions per second and in synchronism with field frequencies. The first and second magnetic heads 15 and 16 are moved step by step alternately and intermittently corresponding to the rotation of the first and second pulse motors. These motors are intermittently driven by the clock pulses which are divided into two series of pulses, as aforementioned, by the pulse control device 53. This pulse division is started by start pulses supplied through an input terminal 57. The clock pulses are supplied to the pulse motors, as drive pulses, through the first and second amplifiers 54 and 55. The fields of a video signal are alternately recorded by the magnetic heads 15 and 16 in tracks laid in the form of concentric circles on the first and second magnetic discs 11 and 12 respectively during the periods while the pulse motors remain inoperative between the drive pulses. When the pulse motors are rotated, the magnetic heads 15 and 16 move radially over the magnetic discs by a distance proportional to the number of pulses supplied to the pulse motors 17 and 18.

The magnetic heads 15 and 16 reach the innermost peripheral portions of the magnetic discs 11 and 12 after starting at their outermost peripheral portions. Movement is on a step-by-step basis radially over the magnetic discs. At the inner points, pulses from the phototransistors 23 and 25 detect the positions of magnetic heads on their paths of linear movement. At the outer points, the phototransistors 27 and 28 detect the positions of magnetic heads. The signals from these phototransistors are AND-gated at an AND gate circuit (not shown) which produces feed reverse pulses as its output, for reversing the direction of rotation of the pulse motors 17 and 18. Input pulses supplied to the pulse motors are controlled to move the feed screws 19 and 20. After the pulse motors reverse their direction of rotation, tracks are laid on the magnetic discs in the form of concentric circles. The tracks laid after the direction of rotation is reversed and tracks laid before the direction of rotation is reversed are arranged in the form of alternate concentric circles as shown in FIG. 2(A) or FIG. 2(B).

When the magnetic heads 15 and 16 reach the outermost peripheral portions of the magnetic discs 11 and 12, they again reverse the direction of their step-by-step movement, as at the innermost peripheral portions. Here the pulses from the phototransistors 24 and 26 detect the positions of the magnetic heads on their paths of linear movement. The phototransistors 27 and 28 detect the positions of magnetic heads feed screws on their paths of rotational movement. The signals are AND-gated at the AND gate circuit which produces feed reverse pulses, as an output signal, for reversing the direction of rotation of the pulse motors 17 and 18. This causes the magnetic heads 15 and 16 to reverse their direction of step-by-step linear movement radially over the magnetic discs 11 and 12 and to again move toward the innermost peripheral portions thereof. In this way, the magnetic heads move alternatively and intermittently radially over the magnetic discs, back and forth from the outermost peripheral portions to the innermost peripheral portions, and vice versa. The heads record a video signal continuously in concentric tracks on the magnetic discs.

If the system according to this invention is incorporated in an apparatus in which it takes 30 seconds to complete the recording of a video signal, on the magnetic discs by the magnetic heads moving back and forth radially over the discs, it is possible to record 1,800 fields or 900 frames on the magnetic discs.

In the system according to this invention, the number of drive pulses applied to the pulse motors 17 and 18 is an address of a position in the recording made by the magnetic heads 15 and 16. The indication or address of such position is given by counting of the number of drive pulses applied to the pulse motors. It is substantially an absolute indication because the position in which the magnetic heads 14 and 16 starts recording is decided by optically aligning the two heads responsive to the phototransistor output signals. The same is true of a playback operation.

The clock pulses or frame pulses synchronous therewith are supplied to a counter circuit 56 where the number of the pulses is counted. A position indicator 58 indicates a head position, corresponding to the number of drive pulses counted. One embodiment of such a position indicator is shown in FIGS. 5(A) and 5(B) as comprising a dial 65, rotatable pointer 66, and pulse motor 67. It will be understood that the pointer indicates the position thus occupied, by one of the magnetic heads 15 and 16, as they move over the magnetic discs in their linear movement radially thereof. This head position is also the position in which a video field of signals is being recorded by one of the magnetic heads, since its movement over one of the magnetic discs exactly corresponds to the position indicated by the indicator 58.

The output of the counter circuit 56 is supplied to an AND-gate circuit 59 simultaneously as it is supplied to the indicator 58. A counter circuit 61 is rendered operative by the output of a predetermined frame-calling device 60. This device 60 produce an output signal which is supplied, on one hand, to a called position indicator 62 and, on the other hand, to the AND-circuit 59. The AND-circuit 59 compares this output with the output of the counter circuit 56. Stop pulses are formed in the AND-circuit 59 and supplied to the pulse control device 53 to stop the rotation of pulse motors. An input terminal 63 enables stop pulses to be applied to the system by the other means. Another input terminal 64 enables other mode control pulses to be applied to the system.

Thus, the aforementioned arrangement makes it possible to indicate the position of a set of frames recorded in tracks in the form of concentric circles on the magnetic discs 11 and 12. The position address is known by the number by associating the position of said set of drive pulses required for driving the pulse motor 17 of the first channel. There is no need for recording any address signal on the magnetic discs 11 and 12. It is possible to call up a predetermined recorded frame by the position indication system since the same number of drive pulses are used in a playback mode as in a recording mode. It is possible, in a playback operation, to return the magnetic heads to a recording start position by applying a reject signal to means for aligning the magnetic heads for the first and second channels. It is possible to call up a predetermined recorded frame when a continuous recording mode is switched to a playback mode, because no change is caused in the relationship between the position of the recorded frame and the number of pulses.

In the embodiment described above, a video signal is recorded with a field being used as a unit. It is to be understood that the invention is not limited to this manner of recording, and that a video signal can also be recorded with a frame being used as a unit. When this is the case, the pulse motors are driven, of course, by pulses produced in each 2 frame period. Also, the invention is not limited to the manner of forming of motor drive pulses described in the embodiment set forth hereinabove in which motor drive pulses are formed from synchronizing signals of the video signal. It is to be understood that the motor drive pulses can be formed from any signal as desired so long as it corresponds to a field signal or frame signal. For example, a signal synchronous with the rotation of the disc motor 13 may be used for producing motor drive pulses.

The aforementioned embodiment may be modified. For example, there is no need for using the outputs of counter circuits 56 and 61 for applying the output of AND-circuit 59 as feed stop pulses to the pulse control device 53, if the calling of the frame position is effected manually while a person watches the feed of the magnetic heads on the dial of the position indicator. The system according to this invention is applicable to not only a normal recording and playback operation but also a high-speed recording and playback operation and low speed recording and playback operation.

While the invention has been described with reference to a preferred embodiment thereof, it is to be understood that the invention is not limited to the precise form of the embodiment, and that many changes and modifications may be made therein without departing from the spirit and scope of the invention which is defined in the appended claims.

We claim:

1. A signal address system for use with apparatus for magnetically recording and reproducing a video signal on a rotating magnetic member, said system comprising at least one magnetic head, means for linearly moving at least one magnetic head over said member for recording and reproducing said video signal on said rotating magnetic member, said moving means including a mechanical structure which takes an incremental movement responsive to each of a succession of drive pulses, means for intermittently driving said magnetic head responsive to each of said drive pulses acting on said structure, whereby head movement corresponds to the number of said drive pulses which are received, means for generating the drive pulses responsive to the field signal or frame signal of said video signal, counter means for counting the number of said drive pulses, and means for effecting an address call-up responsive to an output signal of said counter means.

2. A signal address system as defined in claim 1 in which said rotating magnetic member is a disc rotating magnetic medium, and said magnetic head is moved by said structure linearly, intermittently, and radially over said rotating magnetic medium, said movement being in reciprocating motion, for forming tracks in the form of concentric circles on the magnetic medium.

3. A signal address system as defined in claim 1 further comprising synchronizing signal-separating means for separating synchronizing signals from said video signal, pulse-generating means for producing clock pulses responsive to the synchronizing signals supplied by said separating means, and pulse control means for converting said clock pulses generated by said pulse-generating means into pulses which are spaced apart by a predetermined time interval corresponding to the time interval of fields or frames of the video signal, said intermittent drive means being rendered operative by the output pulses of said pulse control means.

4. A signal address system as defined in claim 1 in which said address call-up means comprises means for giving an indication in accordance with the output signal of said counter means, said indication means indicating the position of a particular signal in a field or frame of said video signal to be recorded and reproduced on said rotating magnetic member by said magnetic head.

5. A signal address system as defined in claim 1 in which said means for effecting an address call-up comprises a second counter means for counting the number of pulses corresponding to the address position of any predetermined field or frame to be called, and means comprising an AND gate circuit operated responsive to a coincidence of the output of said second counter means and the output of said first counter means, thereby counting a number of drive pulses for providing an address-calling signal.

6. A signal address system as defined in claim 5 further comprising means responsive to the output signal of said AND gate means to terminate the production of said drive pulses for driving said intermittent drive means so as to render said magnetic head moving means stationary.

7. A signal address system as defined in claim 5 further comprising second indicator means for indicating the predetermined position to be called when the output of said second counter means is applied thereto.

* * * * *